(12) United States Patent
Heukelbach et al.

(10) Patent No.: US 7,829,633 B2
(45) Date of Patent: *Nov. 9, 2010

(54) METHOD FOR THE PRODUCTION OF A PACKAGING MADE OF THERMOFORMABLE FILM HAVING HIGH THERMAL STABILITY AND A VAPOUR BARRIER

(75) Inventors: Dirk Heukelbach, Wieterstadt (DE); Ekkehard Beer, Bad Schwalbach (DE)

(73) Assignee: TICONA GmbH, Kelsterbach (DE)

( * ) Notice: Subject to any disclaimer, the term of this patent is extended or adjusted under 35 U.S.C. 154(b) by 640 days.

This patent is subject to a terminal disclaimer.

(21) Appl. No.: 10/527,659

(22) PCT Filed: Sep. 11, 2003

(86) PCT No.: PCT/EP03/10077

§ 371 (c)(1), (2), (4) Date: Apr. 8, 2005

(87) PCT Pub. No.: WO2004/026946

PCT Pub. Date: Apr. 1, 2004

(65) Prior Publication Data

US 2006/0020084 A1  Jan. 26, 2006

(30) Foreign Application Priority Data

Sep. 13, 2002 (DE) ................. 102 42 730

(51) Int. Cl.
| | |
|---|---|
| C08F 8/00 | (2006.01) |
| C08F 10/00 | (2006.01) |
| C08F 32/08 | (2006.01) |
| C08F 36/00 | (2006.01) |
| C08F 132/08 | (2006.01) |
| C08L 45/00 | (2006.01) |
| B32B 27/08 | (2006.01) |
| B32B 27/32 | (2006.01) |

(52) U.S. Cl. ............... 525/191; 525/210; 525/211; 526/280; 526/281; 428/515; 428/521

(58) Field of Classification Search ............ 525/191, 525/210, 211; 526/280, 281; 428/515, 521
See application file for complete search history.

(56) References Cited

U.S. PATENT DOCUMENTS

| 5,008,356 A | 4/1991 | Ishimaru et al. |
|---|---|---|
| 5,087,677 A | 2/1992 | Brekner et al. |
| 5,324,801 A | 6/1994 | Brekner et al. |
| 5,468,803 A * | 11/1995 | Takahashi et al. ........... 524/553 |
| 5,532,030 A * | 7/1996 | Hirose et al. ................ 428/35.7 |
| 5,783,273 A * | 7/1998 | Yamamoto et al. ......... 428/35.9 |
| 5,876,814 A * | 3/1999 | Oda et al. ................... 428/36.7 |
| 6,316,560 B1 * | 11/2001 | Jacobs et al. ................ 526/160 |
| 6,365,686 B1 * | 4/2002 | Jacobs et al. ................ 526/127 |
| 6,682,797 B1 * | 1/2004 | Otoi et al. ................ 428/36.92 |
| 6,767,966 B2 | 7/2004 | Berger et al. |
| 6,921,563 B2 * | 7/2005 | Goerlitz et al. ............ 428/34.2 |
| 2002/0012781 A1 | 1/2002 | Beer et al. |
| 2003/0166781 A1 | 9/2003 | Berger et al. |

FOREIGN PATENT DOCUMENTS

| CA | 2 055 397 | 5/1992 |
|---|---|---|
| DE | 109 224 | 10/1974 |
| DE | 100 09 646 | 9/2001 |
| EP | 0 156 464 | 10/1985 |
| EP | 0 384 694 | 8/1990 |
| EP | 0 407 870 | 1/1991 |
| EP | 0 485 893 | 5/1992 |
| EP | 0 503 422 | 9/1992 |
| EP | 1 323 524 | 7/2003 |
| JP | 2000-202951 | 7/2000 |
| WO | WO-01/64786 | 9/2001 |

* cited by examiner

*Primary Examiner*—Nathan M Nutter
(74) *Attorney, Agent, or Firm*—Connolly Bove Lodge & Hutz LLP

(57) ABSTRACT

A process for producing packaging composed of thermoformable film composed of thermoplastic polyolefins provides the thermoforming of the film at temperatures in the range from 70 to 170° C., thus giving packaging which has a high heat distortion temperature in the range from 60 to 200° C. and which has a high water-vapor barrier. The thermoformable film comprises an amount in the range from 5 to 100% by weight of COC with a glass transition temperature $T_g$ in the range from 65 to 200° C.

20 Claims, No Drawings

METHOD FOR THE PRODUCTION OF A PACKAGING MADE OF THERMOFORMABLE FILM HAVING HIGH THERMAL STABILITY AND A VAPOUR BARRIER

RELATED APPLICATIONS

This application is a national stage application (under 35 U.S.C. 371) of PCT/EP2003/010077 filed Sep. 11, 2003 which claims benefit to German application 102 42 730.5 filed Sep. 13, 2002.

The invention relates to a process for producing a packaging composed of a thermoformable film composed of thermoplastic polyolefins, via thermoforming, where, after thermoforming, the film has a high heat distortion temperature and has a high water-vapor barrier.

JP 2000 202951 A2 discloses thermoformable films with a multilayer structure composed of a mostly halogen-containing polymer, such as polyvinyl chloride (PVC) as backing film and of a mixture of an amorphous cycloolefin copolymer (COC) with a semicrystalline high-density polyolefin, such as high-density polyethylene (HDPE), low-density polyethylene (LDPE), or linear low-density polyethylene (LLDPE) as outer layers. However, disadvantages of that material are the halogen content in the backing film and the heat distortion temperature which is mostly unsatisfactory and which is not sufficient to allow the thermoformed film to be subjected to steam-sterilization without dimensional change.

A polymer mixture comprising amorphous COC has been disclosed per se in DE-A 100 09 646, as are films or blister packs produced from the polymer mixture. Although the specification says that the mixture described is suitable for influencing relaxation behavior, shrinkage behavior, or heat distortion temperature, it says nothing concerning the nature and the extent of the heat distortion temperature achieved.

It was an object of the present invention to find a novel process which can produce packaging and which uses a film which has very good thermoformability. The resultant packaging produced via thermoforming is intended to have an improved heat distortion temperature, and in the most favorable case therefore to have a heat distortion temperature sufficiently high to permit steam sterilization of the film, i.e. to prevent the film from changing its geometric dimensions on exposure to a temperature in the range up to 121° C. for a period of at least 20 min. In addition to this property, the packaging is also intended to provide a reliably good barrier to the passage of water vapor, and be capable of economic industrial production.

This object is achieved via a process of the general type mentioned at the outset, its characterizing feature being that the thermoformable film comprises an amount in the range from 5 to 100% by weight, preferably from 20 to 90% by weight, particularly preferably from 25 to 80% by weight, of COC with a glass transition temperature $T_g$ in the range from 65 to 200° C., measured to DIN EN ISO 11357-1 with the aid of a DSC at a heating rate of 10 K/min, and which comprises producing therefrom, via thermoforming at a temperature in the range from 70 to 170° C., preferably from 80 to 160° C., a packaging whose heat distortion temperature is in the range from 60 to 200° C., preferably from 80 to 200° C., particularly preferably from 110 to 180° C.

The thermoforming of the inventive process is advantageously carried out for a period of from 0.5 to 10 s, preferably from 1 to 7 s, at the appropriate temperature.

The average molar mass of the cycloolefin copolymers can be controlled during their preparation via hydrogen feed, catalyst concentration variation, or temperature variation. The thermoformable film suitable for the inventive process comprises cycloolefin copolymers with average molar masses $M_w$ in the range from 500 to 2 000 000 g/mol, preferably from 1000 to 1 000 000 g/mol, in particular from 3000 to 500 000 g/mol. These molar masses determined by gel permeation chromatography (GPC) in chloroform at 35° C., using an RI detector, are relative and are based on calibration with narrowly distributed polystyrene standards.

The cycloolefin copolymers described have viscosity numbers VN to DIN 53 728 in the range from 5 to 5000 ml/g, preferably from 5 to 2000 ml/g, and in particular from 5 to 1000 ml/g.

The thickness of the thermoformable film is generally in the range from 5 to 1000 μm, preferably from 50 to 600 μm, particularly preferably from 100 to 500 μm. This film may take the form of a monofilm or of a multilayer film with two, three, or even more layers, but the thickness of the COC-containing layer here should amount to at least 10% of the total thickness of the multilayer film.

The COC present in the thermoformable film generally contains from 0.1 to 100% by weight, preferably from 0.1 to 99.9% by weight, based on the total weight of the cycloolefin copolymer, of polymerized units which derive from at least one polycyclic olefin of the formulae I, II, II', III, IV, V or VI

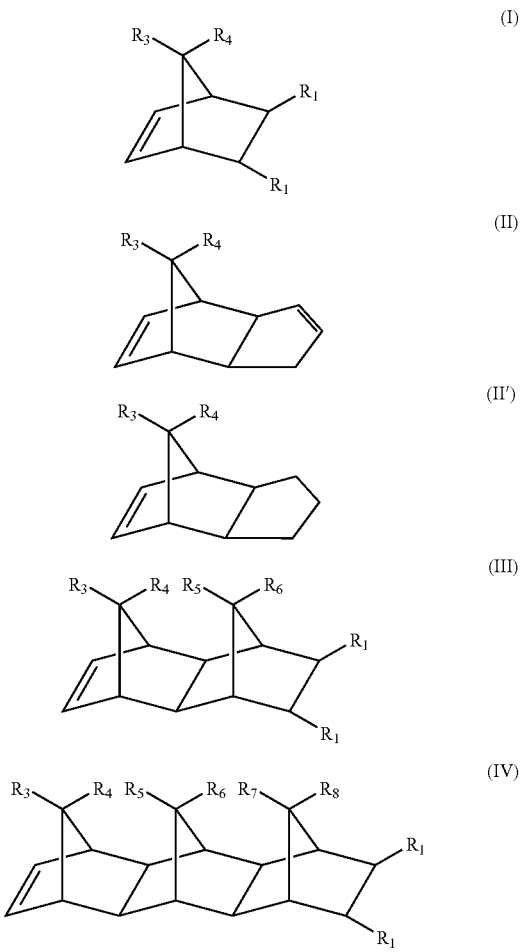

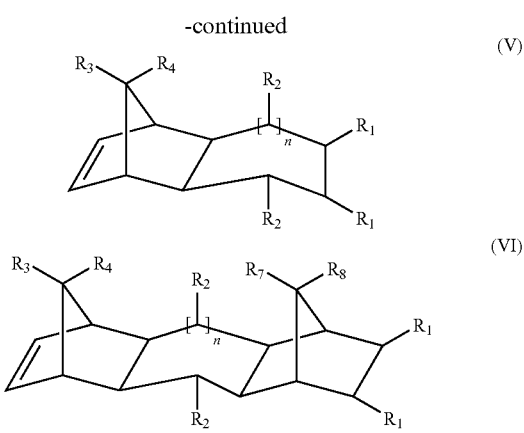

where $R^1$, $R^2$, $R^3$, $R^4$, $R^5$, $R^6$, $R^7$ and $R^8$ are identical or different and are a hydrogen atom or a $C_1$-$C_{20}$-hydrocarbon radical, such as a linear or branched $C_1$-$C_8$-alkyl radical, $C_6$-$C_{18}$-aryl radical, $C_7$-$C_{20}$-alkylenearyl radical, on a cyclic or acyclic $C_2$-$C_{20}$-alkenyl radical, or form a saturated, unsaturated or aromatic ring, where identical radicals $R^1$ to $R^8$ in the various formulae I to VI may have a different meaning and, where n is from 0 to 5, and containing, based on the entire weight of the cycloolefin copolymer, from 0 to 99.9% by weight, preferably from 0.1 to 99.9% by weight, of polymerized units which derive from one or more acyclic olefins of the formula VII

where $R^9$, $R^{10}$, $R^{11}$ and $R^{12}$ are identical or different and are a hydrogen atom or a linear or branched, saturated or unsaturated $C_1$-$C_{20}$-hydrocarbon radical, such as a $C_1$-$C_8$-alkyl radical or a $C_6$-$C_{18}$-aryl radical.

The cycloolefin copolymers used may moreover contain from 0 to 45% by weight, based on the total weight of the cycloolefin copolymer, of polymerized units derived from one or more monocyclic olefins of the formula VIII

where m is a number from 2 to 10.

The cyclic olefins also include derivatives of these cyclic olefins having polar groups, such as halo, hydroxyl, ester, alkoxy, carboxyl, cyano, amido, imido, or silyl groups.

For the purposes of the invention, preference is given to cycloolefin copolymers which contain polymerized units deriving from polycyclic olefins of the formula I or III, and polymerized units deriving from acyclic olefins of the formula VII, in particular olefins having underlying norbornene structure, e.g. norbornene, tetracyclododecene and, where appropriate, vinylnorbornene or norbornadiene.

Preference is also given to cycloolefin copolymers which contain polymerized units derived from acyclic olefins having terminal double bonds, such as α-olefins having from 2 to 20 carbon atoms, particularly preferably ethylene or propylene, examples being norbornene-ethylene copolymers and tetracyclododecene-ethylene copolymers.

Preferred terpolymers are ethylene-norbornene-vinylnorbene, ethylene-nonbornene-norbornadiene, ethylene-tetracyclododecene-vinylnorbornene, ethylene-tetracyclododecene-vinyltetracyclododecene, or ethylene-norbornene-dicyclopentadiene terpolymers.

A very particularly preferred COC which may be used is a copolymer of ethylene and norbornene.

The proportion of the polymerized units derived from a polyene, preferably vinylnorbornene or norbornadiene, is from 0.1 to 50.0 mol %, particularly preferably from 0.1 to 20.0 mol %, and the proportion of the acyclic monoolefin of the formula VII is from 0 to 99.9 mol %, preferably from 5.0 to 80.0 mol %, based on the entire structure of the cycloolefin polymer. In the terpolymers described, the proportion of the polycyclic monoolefin is from 0.1 to 99.9 mol %, preferably from 3.0 to 75.0 mol %, based on the entire structure of the COCs.

The thermoformable film may be transparent or else, via addition of polymers which do not form a homogeneous mixture with the COC, or of pigments, may take the form of an opaque film, or may be produced in the form of a colored film, using soluble dyes.

The use of the COC not only improves the sealability and the slip properties of the film, but also increases ink adhesion to the inventively produced packaging when it is inscribed or printed.

Blends of the polymers mentioned with typical plastics additives, such as antioxidants, metal deactivators, light stabilizers, plasticizers, lubricants, processing aids, antistatic agents, optical brighteners, biostabilizers, flame retardants, or else fillers and reinforcing agents, are also suitable (see also Gächter, Müller, Plastics Additive Handbook, 4th edition, 1993, Munich, Hanser).

The cycloolefin copolymers may be prepared in a known manner at temperatures of from −78 to 200° C. and at a pressure of from 0.01 to 200 bar, in the presence of one or more catalyst systems which comprise at least one transition metal compound and, if appropriate, comprise a cocatalyst and, if appropriate, comprise a support material. Suitable transition metal compounds are metallocenes, in particular stereorigid metallocene. Examples of catalyst systems suitable for the preparation of the COCs are described by way of example in U.S. Pat. No. 5,008,356, EP-A-0 407 870, EP-A-0 485 893, and EP-A-0 503 422, incorporated herein by way of reference.

The cycloolefin copolymers may also be prepared by other methods described briefly below: catalyst systems based on mixed catalysts composed of titanium salts and of organylaluminum compounds are described in DD-A-109 224 and DD-A-237 070. EP-A-0 156 464 describes a preparation method using vanadium-based catalysts.

The cycloolefin copolymers may also be obtained via ring-opening polymerization of at least one of the monomers having the formulae I to VI, followed by hydrogenation of the products obtained.

The polymerization may also take place in two or more stages, and the product here may also be block copolymers, in which connection see DE-A-42 05 416.

COCs are polyolefins which are solid at room temperature despite irregular arrangement of the molecular chains. The heat distortion temperatures of the cycloolefin copolymers can be adjusted within a wide range. For cycloolefin copolymers, the glass transition temperature $T_g$, measured to DIN EN ISO 11357-1 with the aid of a DSC at a heating rate of 10 K/min can be utilized as a guide to the heat distortion temperature determined to ISO 75 part 1 and part 2 on injection moldings. The cycloolefin copolymers described have glass transition temperatures in the range from 65 to 200° C., preferably from 85 to 200° C., in particular from 120 to 190° C. The inventive film may also, if appropriate, comprise mixtures of various COCs with different glass transition temperatures.

The density of the cycloolefin copolymers used in the present invention is usually in the range from 0.9 to 1.1 g/cm³, preferably from 0.9 to 1.05 g/cm³.

Suitable polyolefins which may be used alongside the COC in the film of the invention are high-or low-density polyethylenes (HDPE, LDPE, LLDPE), ethylene-vinyl acetate copolymer, ionomer, polypropylene, olefin copolymers, other thermoplastics, or mixtures thereof.

There are embodiments of the inventive process in which the thermo-formable film is combined with other films to give a multilayer composite. The composite may be produced via lamination of films previously produced separately, via coextrusion, or via extrusion coating or extrusion lamination. Between the individual layers there may also be other layers improving adhesion. The substances used for this purpose may comprise at least one polymer and are well known per se.

It was particularly surprising that the cut film, with all of its components, arising during the manufacturing process for the thermoformable film can be reused in the form of regrind and therefore recycled, without any adverse effect on the thermoformability of the film or on the heat distortion temperature of the packaging produced therefrom. This permits a marked improvement in the cost-effectiveness of the inventive process and permits a reduction in pollution.

The layer which improves adhesion may advantageously be applied in the melt or else in the form of a solution, suspension or solvent-containing adhesive.

Thermoformable films for the inventive process may, by way of example, be produced via a known process for producing a mono-or multilayer plastics film by compressing the polymers for the film and/or the polymer mixtures in an extruder, heating them, and then extruding the melt or the melts via a flat-film die, and drawing off the resultant film on one or more rolls or on steel belts. Any additives added may be present by this stage in the polymer or in the polymer mixture, or may be added via masterbatch technology.

The melt(s) may also be extruded via an annular die, the resultant film being processed in a blown-film system to give the film and being collapsed by way of rolls or by way of belts.

One or both surface(s) of the film may, if appropriate, be corona-or flame-treated by known methods. Treatment of the surface prepares it for subsequent inscription or printing by well-known methods.

It was particularly surprising that the inventive process using the thermo-formable film, all of the details of which have been described above, features particularly good reproduction of detail during thermoforming, and it was especially surprising that very uniform wall thickness is obtained during thermoforming. It was also surprising that two films produced in this way have very good sealing behavior with respect to one another, i.e. leakproof sealed composites can be produced with a low minimum sealing temperature and can then be separated again manually, or bonds incapable of mechanical separation can be produced at an elevated sealing temperature. Another advantage of the thermoformable film is its excellent stamping performance, evidenced by no formation of sharp edges or corners during the stamping-out process.

EXAMPLES

The following starting materials were used in the examples below:
1. Ethylene-norbornene copolymer with a glass transition temperature ($T_g$) of 80° C. and a viscosity number (VN) of 80 ml/g (trade name ®Topas 8007, Ticona GmbH, Frankfurt am Main).
2. Ethylene-norbornene copolymer with $T_g$ of 140° C. and a VN of 60 ml/g (trade name ®Topas 6013, Ticona GmbH, Frankfurt am Main).
3. Polyethylene (trade name ®Lupolex 18QFA, Basell GmbH)
4. Polyethylene (trade name ®Luflexen 18PFAX, Basell GmbH)
5. Polypropylene (trade name HB600TG, Borealis)

The materials mentioned were used in the examples shown in table 1 to produce films via extrusion, and these were stretched by 100% at the stated temperatures. The change in length of these stretched films was then determined as a function of temperature over 20 min. The shrinkage value is calculated from the difference in length prior to and after heat-aging, divided by the initial length. The shrinkage is a measure of the heat distortion temperature of the thermoformed films, e.g. thermoformed blister packs.

TABLE 1

| Example | COC | Polyolefin | Stretching temperature [° C.] | Shrinkage temperature* [° C.] | Water-vapor permeability [g/m² · d] |
|---|---|---|---|---|---|
| 1a | 100% 8007 | — | 90 | 80 | 1 |
| 1b | 80% 8007 | 20% 18QFA | 90 | 75 | 1.2 |
| 1c | 60% 8007 | 40% 18QFA | 90 | 70 | 1.5 |
| 1d | 20% 8007 | 80% 18QFA | 90 | 30 | 3.8 |
| 2a | 100% 6013 | — | 150 | 142 | 1.3 |
| 2b | 80% 6013 | 20% 18PFAX | 150 | 144 | 1.5 |
| 2c | 60% 6013 | 40% 18PFAX | 150 | 141 | 1.8 |
| 2d | 40% 6013 | 60% 18PFAX | 150 | 144 | 2.9 |
| 2e | 20% 6013 | 80% 18PFAX | 150 | 143 | 4.2 |
| c1 | — | 100% 18QFA | 90 | <30 | 4.8 |
| c2 | — | 100% 18PFAX | 150 | 80 | 4.7 |
| c3 | — | 100% PP | 70 | 65 | 2.5 |

*The shrinkage temperature stated is the temperature at which shrinkage after 20 min amounts to precisely 5%.
**Water-vapor permeability was measured to ASTM F 372 at a temperature of 38° C. and at a relative humidity of 90%, and standardized to a 100 µm film.

The values in table 1 clearly show the increase in heat resistance of all of the polyolefin films via blending with COC. By way of example, thermo-formed blisters composed of films which comprise COC with $T_g$ of 140° C. are sterilized using steam at a temperature of 121° C. without any recovery shrinkage or any dimensional change.

The invention claimed is:

1. A process for producing a packaging comprising a thermoformed film comprising thermoplastic olefins comprising thermoforming a thermoformable film at a temperature in the range from 70 to 170° C.,
wherein said thermoformable film is a monofilm or a multilayer film,
wherein said monofilm or at least one layer of said multilayer film comprises from 20 to 80% by weight, based on the total weight of said thermoplastic polyolefins, of at least one COC having a glass transition temperature Tg in the range from 65 to 200° C., as measured to DIN EN ISO 11357-1 with the aid of a DSC at a heating rate of 10 K/min,
wherein said thermoformed film has an improved heat distortion temperature and a high water-vapor barrier, and
wherein the heat distortion temperature of said packaging is in the range of from 60 to 200° C.

2. The process of claim 1, wherein said COC has an average molar mass, expressed as Mw, in the range of from 500 to 2,000,000 g/mol.

3. The process of claim 1, wherein said COC has a viscosity number to DIN 53 728 in the range of from 5 to 5,000 ml/g.

4. The process of claim 1, wherein said monofilm or said multilayer film has a total thickness in the range of from 5 to 2,000 μm.

5. The process of claim 1, wherein said COC has a glass transition temperature Tg in the range of from 85 to 200° C. and wherein said monofilm or at least one layer of said multilayer film optionally comprises a mixture of COCs having different glass transition temperatures Tg.

6. The process of claim 1, wherein said thermoformable film further comprises additional polyolefins selected from the group consisting of high-or low-density polyethylenes (HDPE, LDPE, LLDPE), ethylene-vinyl acetate copolymer, ionomer, polypropylene, olefin copolymers, plastomers, and mixtures thereof.

7. The process of claim 1, wherein said thermoformable film comprises up to 40% by weight of cut film arising during the production process in the form of regrind.

8. A packaging produced by the process of claim 1.

9. The packaging of claim 8, wherein said packaging is a blister pack.

10. The process of claim 1, wherein said thermoforming is performed at a temperature in the range of from 80 to 160° C. and the heat distortion temperature of said packaging is in the range of from 110 to 180° C.

11. The process of claim 1, wherein said COC has an average molar mass, expressed as Mw, in the range of from 3,000 to 500,000 g/mol.

12. The process of claim 2, wherein said COC has a viscosity number to DIN 53 728 in the range of from 5 to 1,000 ml/g.

13. The process of claim 12, wherein said monofilm or said multilayer film has a total thickness in the range of from 200 to 400 μm.

14. The process of claim 1, wherein said COC has a glass transition temperature Tg in the range of from 120 to 190° C. and wherein said monofilm or at least one layer of said multilayer film optionally comprises a mixture of COCs having different glass transition temperatures Tg.

15. A packaging produced by the process of claim 14, wherein the heat distortion temperature of said packaging is in the range of from 110 to 180° C.

16. The process of claim 1, wherein said monofilm or at least one layer of said multilayer film comprises from 25 to 80% by weight, based on the total weight of polyolefins, of said at least one COC.

17. The process of claim 1, wherein said COC comprises, based on the total weight of said COC, from 0.1 to 100.0% by weight of polymerized units which are derived from at least one polycyclic olefin of formulae (I), (II), (II'), (III), (IV), (V), or (VI)

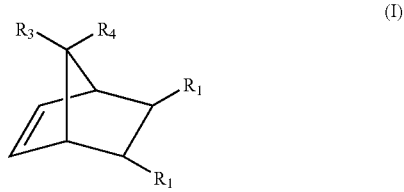

(I)

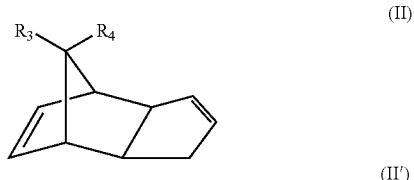

(II)

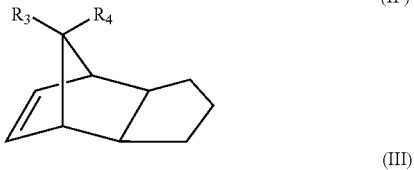

(II')

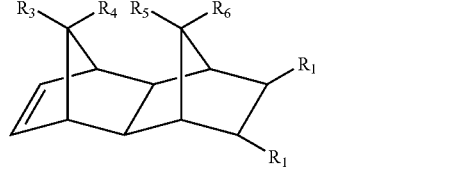

(III)

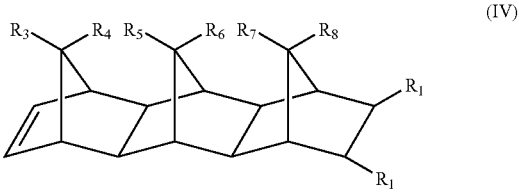

(IV)

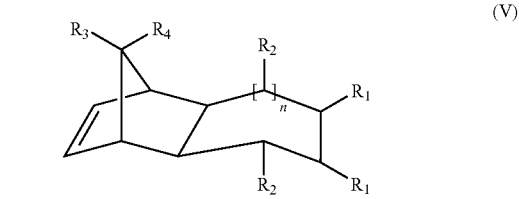

(V)

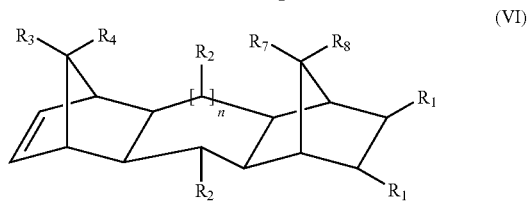

(VI)

wherein

R$_1$, R$_2$, R$_3$, R$_4$, R$_5$, R$_6$, R$_7$, and R$_8$ are, identically or differently, a hydrogen atom or a C$_1$-C$_{20}$ hydrocarbon radical, or form a saturated, unsaturated or aromatic ring, and wherein identical radicals R$_1$, R$_2$, R$_3$, R$_4$, R$_5$, R$_6$, R$_7$, and R$_8$ in the various formulae (I), (II), (III), (IV), (V), and (VI) have a different meaning; and n is an integer from 0 to 5.

18. The process of claim 1, wherein said COC comprises, based on the total weight of said COC, from 0.1 to 99.9% by weight of polymerized units which are derived from one or more acyclic olefins of formula (VII)

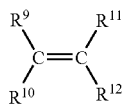

(VII)

wherein

R$^9$, R$^{10}$, R$^{11}$, and R$^{12}$ are, identically or differently, a hydrogen atom or a linear or branched, saturated or unsaturated C$_1$-C$_{20}$ hydrocarbon radical.

19. The process of claim 17, wherein said C$_1$-C$_{20}$ hydrocarbon radical is a linear or branched C$_1$-C$_8$-alkyl radical, a linear or branched C$_6$-C$_{18}$-aryl radical, a linear or branched C$_7$-C$_{20}$-alkylenearyl radical, or a cyclic or acyclic C$_2$-C$_{20}$-alkenyl radical.

20. The process of claim 18, wherein said C$_1$-C$_{20}$ hydrocarbon radical is a linear, branched, saturated or unsaturated C$_1$-C$_8$-alkyl radical or a C$_6$-C$_{18}$-aryl radical.

* * * * *